United States Patent
Cai et al.

(10) Patent No.: US 8,218,742 B2
(45) Date of Patent: Jul. 10, 2012

(54) METHOD OF CORRELATING CHARGING DATA RECORDS WITHIN AN OFFLINE CHARGING SYSTEM

(75) Inventors: Yigang Cai, Naperville, IL (US); Chun Guang Xu, Beijing (CN); Sheng Chen, Beijing (CN); Hong Wei Sun, Beijing (CN)

(73) Assignee: Alcatel Lucent, Paris (FR)

( * ) Notice: Subject to any disclaimer, the term of this patent is extended or adjusted under 35 U.S.C. 154(b) by 1302 days.

(21) Appl. No.: 11/889,755

(22) Filed: Aug. 16, 2007

(65) Prior Publication Data

US 2008/0181378 A1 Jul. 31, 2008

(30) Foreign Application Priority Data

Jan. 30, 2007 (CN) .......................... 2007 1 0105400

(51) Int. Cl.
*H04M 15/00* (2006.01)

(52) U.S. Cl. ..................... 379/126; 379/114.28; 379/133

(58) Field of Classification Search ............. 379/114.03, 379/114.04, 114.28, 116, 121.05, 126, 133; 455/405, 406
See application file for complete search history.

(56) References Cited

U.S. PATENT DOCUMENTS

| 6,411,604 B1 * | 6/2002 | Brockman et al. ............ 370/244 |
| 6,891,938 B1 * | 5/2005 | Scott et al. ............... 379/112.06 |
| 7,231,024 B2 * | 6/2007 | Moisey et al. ................ 379/126 |
| 2003/0096592 A1 * | 5/2003 | Moreau et al. ................ 455/406 |

* cited by examiner

*Primary Examiner* — Quoc D Tran
(74) *Attorney, Agent, or Firm* — Harness, Dickey & Pierce, P.L.C.

(57) ABSTRACT

In an example method of correlating charging data records within an offline charging system, each of a plurality of sources selects a same one of a plurality of charging functions in which to route charging information associated with a given call session or event. In an example, the plurality of sources corresponds to either a plurality of network elements or a plurality of charging data functions. In another example, the plurality of charging functions corresponds to either a plurality of charging data functions or a plurality of charging gateway functions. At the selected charging function, the routed charging information is correlated.

24 Claims, 9 Drawing Sheets (CDF Based Correlation)

(CGF Based Correlation)

(CDF Based Correlation with Centralized Database)

(CGF Based Correlation with Centralized Database)

METHOD OF CORRELATING CHARGING DATA RECORDS WITHIN AN OFFLINE CHARGING SYSTEM

PRIORITY STATEMENT

This application claims priority under 35 U.S.C. §119 to Chinese Patent Application No. 200710105400.9, filed on Jan. 30, 2007, in the Chinese Patent Office (CPO), the disclosure of which is incorporated herein in its entirety by reference.

BACKGROUND OF THE INVENTION

1. Field of the Invention

Example embodiments of the present invention are related generally to a method of correlating charging data records within an offline charging system.

2. Description of the Related Art

Communication devices (e.g., wireless communication devices, wired communication devices, etc.) may be provisioned services which are associated with a certain fee or charge. The service provisioning is monitored and reported to a billing domain for the service provider in order to charge or bill the requesting communication device. The charging may be "online" in the sense that the billing is performed at the same time as the service being rendered, which may also be referred to as "real-time" charging. Alternatively, the charging may be "offline" in the sense that the billing is separate from the service provisioning. For example, offline charging may include storing charging information and periodically uploading the stored charging information, such as at a monthly billing invoice. Online charging, which may be reported over an Ro interface to a network (e.g., a different interface may be used in 1G and 2G networks], may directly affect the service provisioning in real-time (e.g., if a cell phone user exceeds his/her time limit, the call may be ended, etc.). In contrast, offline charging does not necessarily affect the service provisioning in "real-time".

3GPP Release 6 standards define an offline charging system to provide charging services. FIG. 1 illustrates a block diagram of a conventional offline charging architecture in accordance with the 3GPP Release 6 standards.

Referring to FIG. 1, the offline charging architecture includes an offline charging network 100, which is connected to a billing domain (BD) 140 via an interface Bx. The offline charging network 100 includes a charging trigger function (CTF) 110, a charging data function (CDF) 120 and a charging gateway function (CGF) 130. The billing domain 140 may correspond to a billing system and/or a billing mediation device.

While not illustrated in FIG. 1, it is understood that the CTF 110 is an integrated component (e.g., a software component) within each "network element" (NE) of the offline charging network 100. As used herein, a network element is any network physical entity or function entity within the offline charging network 100 (e.g., Call Session Control Function (CSCF), Application Server (AS), Multimedia Resource Control Function (MRFC), Gateway GPRS Support Node (GGSN), etc.) that may provide charging data to enable the CDF 120 to generate a charging data record (CDR), as will be described in greater detail below. For example, the network element may correspond to a serving call session control function (S-CSCF), a proxy-CSCF (P-CSCF), an interrogating-CSCF (ICSCF), a breakout gateway control function (BGCF), a media gateway control function (MGCF), an application server (AS), etc.

The CTF 110 generates charging events by monitoring network resource usage. The CTF 110 receives information from its network element. This information includes, but is not limited to, charging information relating to the services provided by the network element within which the CTF 110 is located. The CTF 110 is the focal point for collecting the charging information pertaining to charging events and charging sessions related to the network element. The CTF 110 assembles this charging information into charging sessions and charging events, and sends the charging sessions and charging events to the CDF 120. Charging sessions and charging events are well-known in the art. Generally, the CTF 110 includes an accounting metrics collection function and an accounting data forwarding function.

The CDF 120 receives the charging sessions and charging events from the CTF 110 via an Rf interface. The Rf interface is a "diameter reference point", and functions as an interface between one or more network elements within the offline charging network 100 and the CDF 120. Typically, the network elements within the offline charging network 100 send Accounting Record (ACR) messages (e.g., start, interim, stop, event, etc.) to the CDF 120 for offline charging. The CDF 120 responds to the messages received from a given network element with an acknowledgement (e.g., an accounting answer (ACA) response). The CDF 120 uses the information contained in the ACR messages (e.g., relating to charging sessions and charging events) to construct and/or modify Charging Data Records (CDRs). The CDF 120 then transfers the CDRs to at least one CGF 130 via an interface Ga. The interface Ga is a physical interface between the CDF 120 and the CGF 130. Generally, the Ga interface is used to transfer CDRs generated or modified in the CDF 120 to the CGF 130.

The CGF 130 acts as a gateway between the offline charging network 100 and the BD 140. The CGF 130 uses a Bx interface to transfer CDRs to the BD 140. Generally, CDR files are transferred from the CGF 130 within the offline charging network 100 to the BD 140 on the Bx interface in accordance with well-known protocols, such as File Transfer Protocol (FIP), secure FTP (SFrP), etc. Upon receiving the CDR files, at the BD 140, from the CGF 130 on the Bx interface, the BD 140 processes the CDRs to generate subscriber bills.

In session based charging, the CDF 120 opens a CDR when an initial charging event (i.e., an event specifying the start of a charging session) is received. The CDF 120 adds information to an opened CDR in response to receiving interim charging events, which may occur during a charging session. The CDF 120 may then close a CDR for a variety of reasons. The closing of the CDR may be based on the configuration on the CDF 120. For example, the CDF 120 may close a CDR based on one or more of the following: a CDR time limit; a CDR volume limit; a limit of change on charging conditions; an end of user session (i.e., reception of the final charging event describing the charging session termination); and implementation limits (e.g. memory size).

If the CDF 120 closes a CDR, but the charging session remains active, a subsequent CDR is opened. Hence multiple "partial CDRs" may be needed to completely describe the charging session for charging purposes. As such, the opening and closure of CDRs may occur asynchronously to the reception of the charging events.

The following two formats of partial CDRs are generally described in the 3GPP Release 6 standards. The first format is referred to as a Fully Qualified Partial CDR (FQPC) and is a partial CDR that contains a complete set of CDR Fields. The second format is referred to as a Reduced Partial CDR (RPC) and is a reduced format partial CDR that contains the Mandatory fields (M) as well as changes occurring in any other field relative to the previous partial CDR.

While the processing of partial CDRs is not described with specificity within the 3GPP Release 6 standard, conventionally, the partial CDRs are "consolidated" or combined to form a CDR file at the CGF in order to determine the full information related to a particular offline event or session for a given network element. Here, "consolidating" means merging partial CDRs of for one call session or event generated at one network element. Accordingly, the "consolidating" step merges one or more CDRs and/or partial CDRs into a single, resultant consolidated CDR. Here, to "merge" CDRs and/or partial CDRs means analyzing collected CDRs (e.g., associated with a given call event or session for a single network element), retrieving relevant CDR fields for the collected CDRs and then reorganizing/reformatting the collected CDRs into a new, merged CDR. The functions of both consolidating and merging of CDRs and partial CDRs are well-known in the art, and will not be discussed further for the sake of brevity.

The CGF sends the consolidated CDR Mfie to the billing domain 140 over the Bx interface. The billing domain 140 is responsible for "correlating" all consolidated CDR files sent from one or more CGFs for a particular event or session. The CDR correlation may include combining all CDR files related to a given event or session. Because it is typical for one CDR to be generated per call, and each call typically involves a number of network elements, the billing domain 140 may receive multiple CDR files for a particular event or session. The billing domain 140 typically supports legacy charging protocols (e.g., 1G, 2G, etc.) such that it is relatively expensive to accommodate system-specific billing protocols at the billing domain 140.

As discussed above, conventional offline charging systems generate one CDR per session, per call, per NE. In addition, partial CDRs may be generated. Thus, for a single session, call, etc., multiple CDRs and/or partial CDRs may be generated, which the billing domain must then correlate. Here, "correlating" means merging CDRs (e.g., consolidiated CDRs or CDR files) of one session generated at a plurality of network elements. Accordingly, the "correlating" step merges one or more consolidated CDRs for different network elements into a single, resultant correlated CDR. Here, to "merge" consolidated CDRs means analyzing collected CDRs (e.g., associated with a given call event or session for each network element), retrieving relevant CDR fields for the collected CDRs and then reorganizing/reformatting the collected CDRs into a new, merged CDR. The functions of both correlating and merging are well-known in the art, and will not be discussed further for the sake of brevity.

Typically, it is difficult for billing domains to adapt to perform CDR correlation, and billing domains may be reluctant to adopt standards with such requirements. For example, current 1G and 2G networks only create one Automated Message Accounting (AMA) record for billing. In contrast, for example, a more modern IMS network creates multiple CDRs for billing. Accordingly, it may be difficult for a billing domain (e.g., billing domain 140) to process the CDRs for an IMS network to rate and/or bill the session/call for the one or more NEs.

SUMMARY OF THE INVENTION

An example embodiment of the present invention is directed to a method of correlating charging data records within an offline charging system, including selecting, at each of a plurality of sources, a same one of a plurality of charging functions in which to route charging information associated with a given call session or event and correlating, at the selected charging function, the routed charging information from each of the plurality of sources.

BRIEF DESCRIPTION OF THE DRAWINGS

Example embodiments of the present invention will become more fully understood from the detailed description provided below and the accompanying drawings, wherein like elements are represented by like reference numerals, which are given by way of illustration only and thus are not limiting of the present invention and wherein.

DETAILED DESCRIPTION OF EXAMPLE EMBODIMENTS

In order to better understand the present invention, conventional charging data function (CDF) and charging gateway function (CGF) implementations will be described within offline charging systems, followed by a description of a charging data record (CDR) reporting process performed within the conventional offline charging system. Then, an offline charging system according to an example embodiment of the present invention will be described, followed by CDR reporting processes performed within the example offline charging systems.

Conventional "Dedicated" CDF and CGF System

Figure 2:
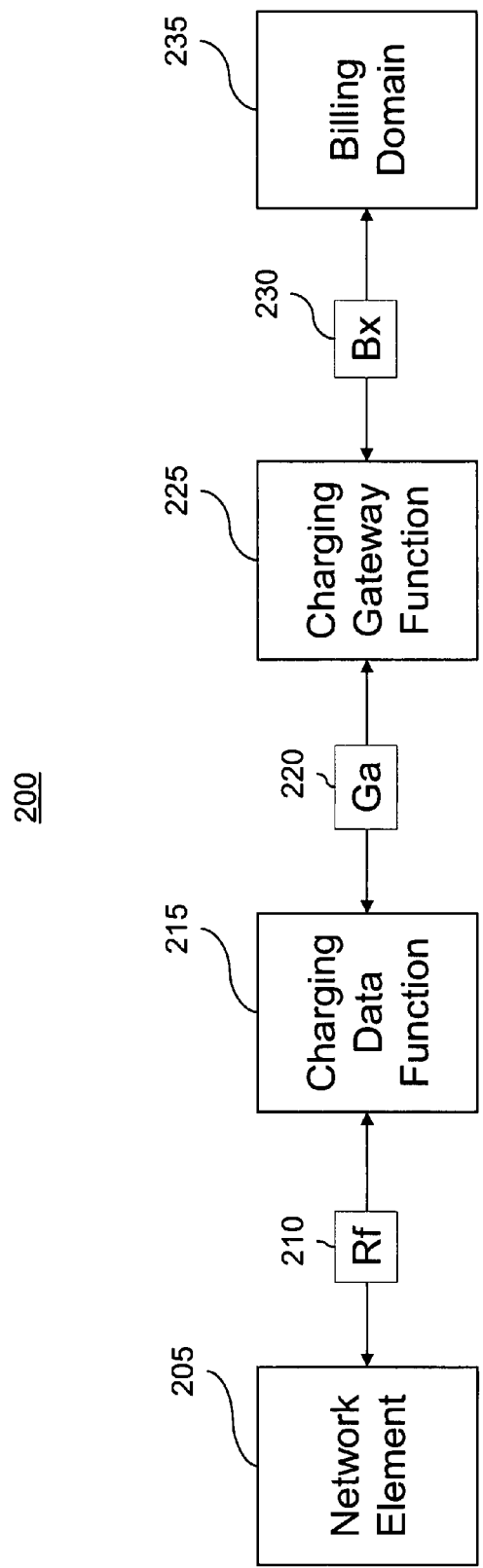
FIG. 2 illustrates a conventional offline charging system.

FIG. 2 illustrates a conventional offline charging system 200. The offline charging system 200 includes a network element (NE) 205, an Rf interface 210, a CDF 215, a Ga interface 220, a CGF 225, a Bx interface 230 and a billing domain (BD) 235.

Figure 1:
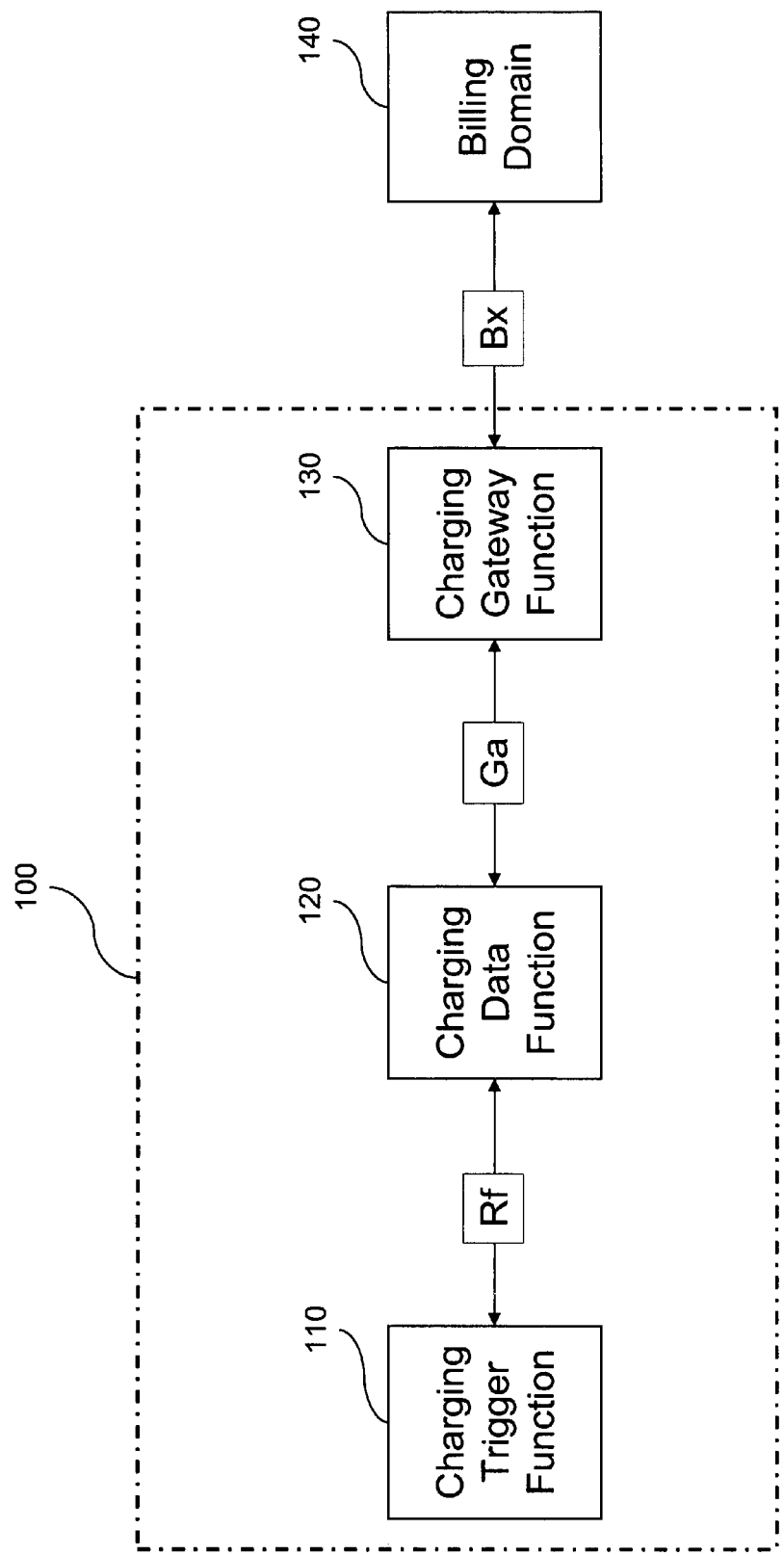
FIG. 1 illustrates a block diagram of a conventional offline charging architecture in accordance with the 3GPP Release 6 standards.

Referring to FIG. 2, the offline charging system 200 is a modification of the offline charging architecture illustrated in FIG. 1. Accordingly, the Rf interface 210, the Ga interface 220 and the Bx interface 230 correspond to the Rf interface, the Ga interface and the Bx interface described with respect to FIG. 1, and as such will not be described further for the sake of brevity. Likewise, the billing domain 235 corresponds to the billing domain 140 of FIG. 1.

Referring to FIG. 2, the CDF 215 and the CGF 225 are each "dedicated" modules. In other words, the CDF 215 and the CGF 225 are located in separate, physical elements within the offline charging network, and are connected by a physical Ga interface. In FIG. 2, the CGF 225 is configured to operate exclusively as a CGF, while the CDF 215 is configured to operate exclusively as a CDF (e.g., in contrast to the duel-functionality of an integrated CDF/CGF).

The network element 205 is representative of one of a plurality of network elements which may be included within an offline charging network, such as the offline charging network 100 of FIG. 1. The network element 205 includes a charging trigger function (CTF) (e.g., CTF 110 of FIG. 1) such that the network element 205 is capable of outputting information related to billing (e.g., in response to a charging "event", in response to an activated billing session, etc.) to the CDF 215 via the Rf interface such that the CDF 215 may generate a CDR, or numerous partial CDRs. The CDF 215 forwards the CDR(s) to the CGF 225 via the Ga interface. The CGF 225 formats the received CDR(s) for the billing domain 235 and forwards the formatted CDR(s) to the billing domain 235 via the Bx interface 230.

Conventional "Integrated" CDF/CGF System

Figure 3:
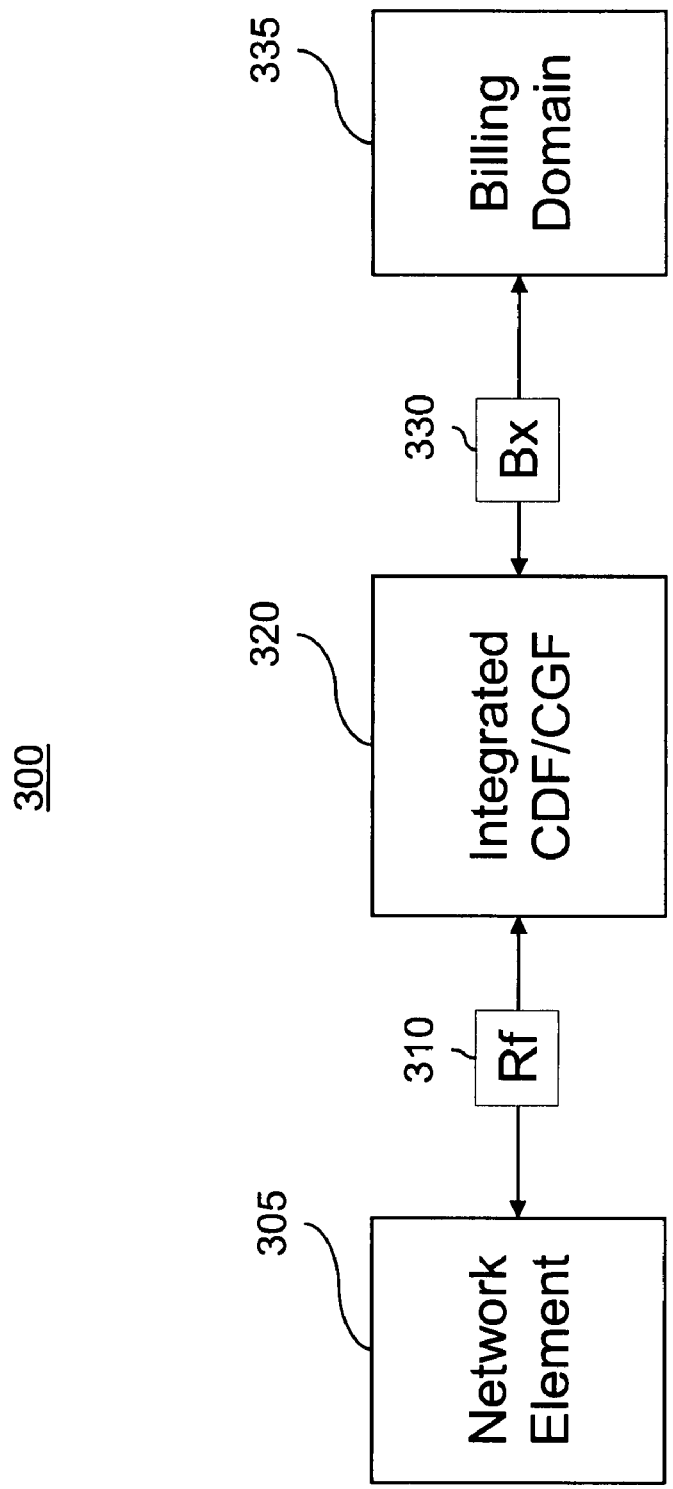
FIG. 3 illustrates another conventional offline charging system.

FIG. 3 illustrates a conventional offline charging system 300. The offline charging system 300 includes a network element (NE) 305, an Rf interface 310, an integrated CDF/CGF 320, a Bx interface 330 and a billing domain 335.

The offline charging system 300 of FIG. 3 is identical to the offline charging system 200 of FIG. 2 except that the functionality of the CDF 215, the Ga interface 220 and the CGF 225 has been consolidated within the integrated CDF/CGF 320. In FIG. 3, the integrated CDF/CGF 320 is "integrated" in the sense that software supporting the CDF and CGF is located within a single physical element. Further, the Ga interface 220 from FIG. 2 is not present within the offline charging system 300 of FIG. 3.

The Ga interface 220 from FIG. 2 is not implemented in the offline charging system 300 of FIG. 3 because a single software application may be deployed to perform the functionality of the integrated CDF/CGF 320. Accordingly, a Ga interface between the CDF and the CGF, which in FIG. 2 connects physically separated elements, need not be included because the CDF and CGF are executed at the same physical element.

As will be appreciated by one of ordinary skill in the art, the software applications which support the functionality of the CDF 215, the CGF 225 and the integrated CDF/CGF 320 are not interchangeable or substitutable.

Conventional CDR Reporting

Figure 4:
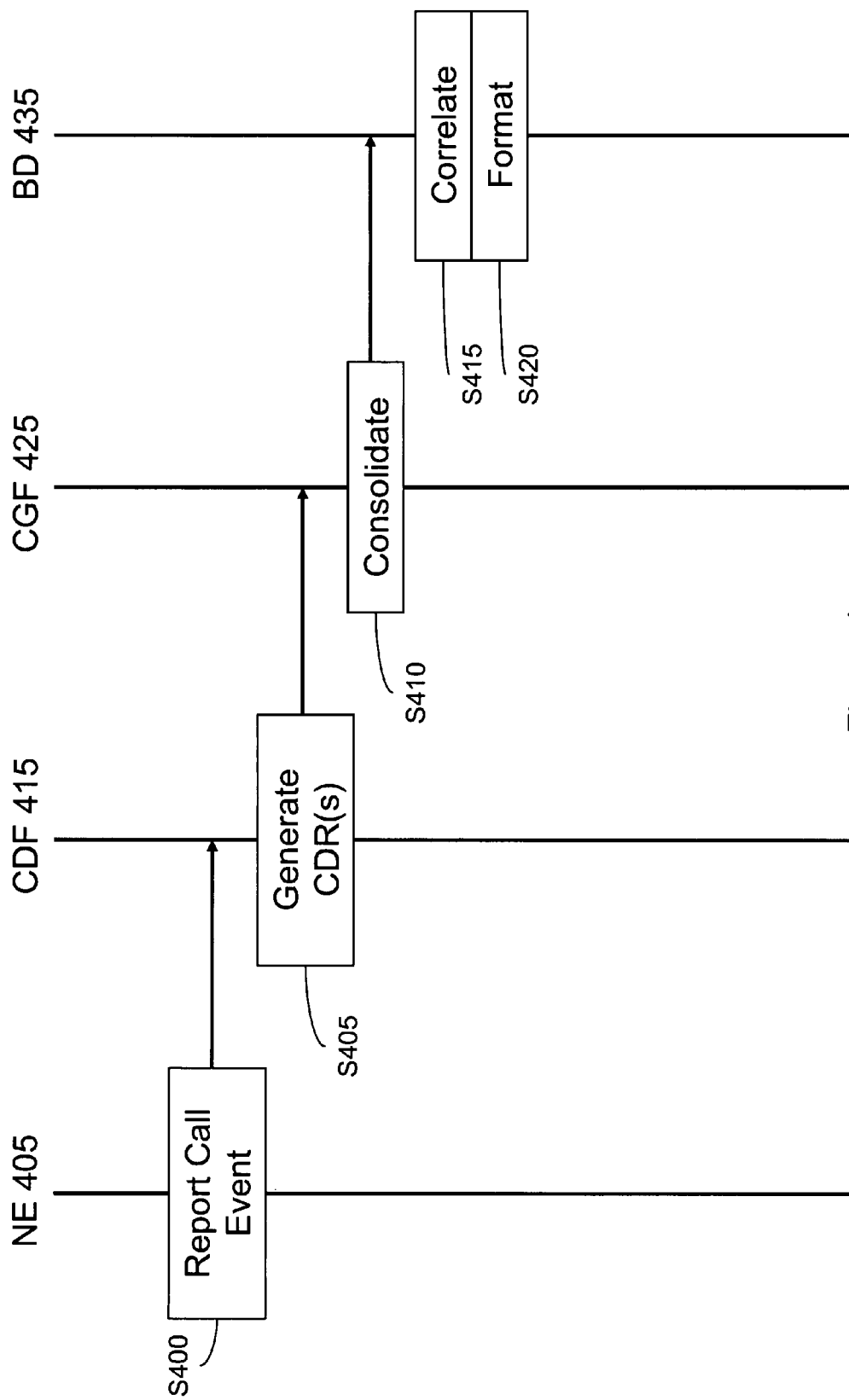
FIG. 4 illustrates a conventional charging data record (CDR) reporting process performed within the offline charging system of FIG. 2.

FIG. 4 illustrates a conventional CDR reporting process performed within the offline charging system 200 of FIG. 2.

Referring to FIG. 4, in step S400, the network element 205 reports a billing or charging event to the CDF 215. For example, the network element 205 sends an ACR having an AVP storing charging information related to a given billing or charging event to the CDF 215. The CDF 215 generates one or more CDRs or partial CDRs in step S405 and forwards the generated CDR(s) to the CGF 225 via the Ga interface.

In step S410, the CGF 225 re-processes, re-formats and/or consolidates each of the received CDRs and/or partial CDRs received from the CDF 215 for one particular network element 205, and then forwards the consolidated CDRs to the billing domain 235. The consolidating step S410 includes "packaging" the various CDRs into a CDR file. As discussed in the Background of the Invention section, consolidating means merging partial CDRs of for one call session or event generated at one network element. Accordingly, the "consolidating" step S410 merges one or more CDRs and/or partial CDRs into a single, resultant consolidated CDR. Here, to "merge" CDRs and/or partial CDRs means analyzing collected CDRs (e.g., associated with a given call event or session for a single network element), retrieving relevant CDR fields for the collected CDRs and then reorganizing/reformatting the collected CDRs into a new, merged CDR. As discussed in the Background of the Invention section, consolidating CDRs and/or partial CDRs is well-known in the art, and will not be described further for the sake of brevity.

Steps S400 through S410 are typically performed concurrently at more than one network element for a given call event or session. In step 415, the billing domain 235 typically "correlates" the multiple CDR files forwarded from one or more CGFs by collecting all CDR files associated with a given charging session or event. For example, the billing domain 235 evaluates CDRs and partial CDRs, collects those CDRs and partial CDRs having the same ICID, and "merges" the collected CDRs and partial CDRs (e.g., into a single ffie). Correlating is generally well-known in the art and will not be discussed further for the sake of brevity. In step S420, the billing domain 235 formats the collected CDR files into a CDR format, which the billing domain 235 can then use to charge the network element(s) associated with the given charging session or event.

As will be appreciated by one of ordinary skill in the art, in the above conventional scenario, the billing domain 235 must process the offline charging data records (e.g., multiple CDRs per session/call) of the conventional offline charging system 200 in order to properly rate and bill the session/call. However, it is typically difficult and expensive to update conventional billing domains with new software to correlate and process multiple CDRs per session/call. Accordingly, as will now be described with respect to example embodiments of the present invention, the correlation of CDRs for the offline charging system may be "offloaded" from the billing domain to the offline charging network to correlate CDRs for a single session/call so as to increase compatibility with billing domains, as well as to ease the transition of a billing domain to a new offline charging correlation process for CDRs.

Offline Charging System Based Correlation

Examples of performing offline charging will now be described with respect to example embodiments of the present invention. First, an example of CDF based correlation is described wherein CDR correlation is performed at the CDF. This is followed by an example of CGF based correlation wherein CDR correlation is performed at the CGF. Then, the CDF and CGF based correlation charging examples are described as performed in conjunction with a centralized database.

Figure 5:
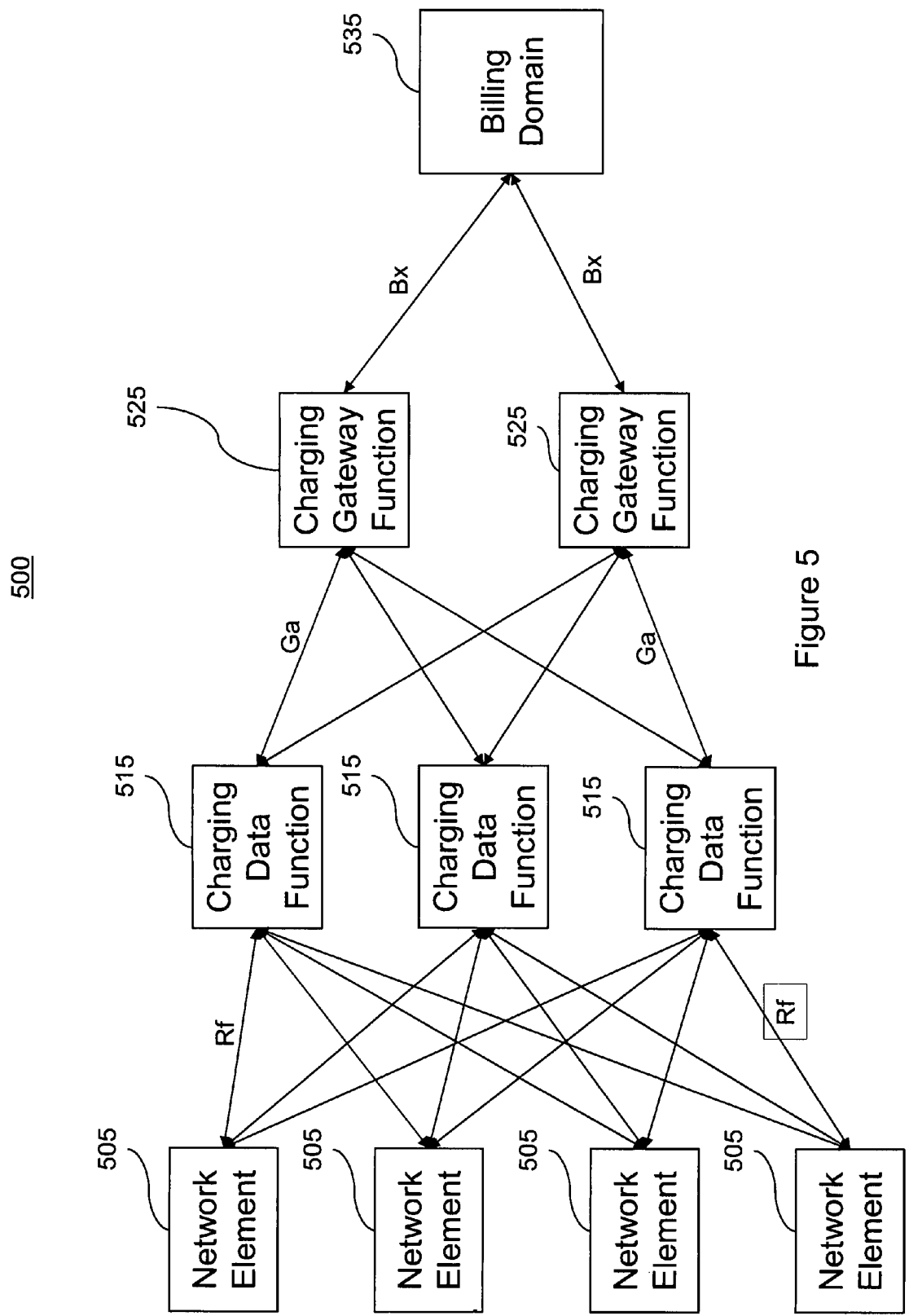
FIG. 5 illustrates an offline charging system according to an example embodiment of the present invention.

FIG. 5 illustrates an offline charging system 500 according to an example embodiment of the present invention. The offline charging system 500 includes a plurality of network elements 505, a plurality of CDFs 515, a plurality of CGFs and a billing domain 535. Each network element 505 is linked to each CDF 515 over an Rf interface, each CDF 515 is linked to each CGF 525 over a Ga interface and each CGF 525 is linked to the billing domain 535 over a Bx interface.

The example embodiment of FIG. 5 generally corresponds to conventional FIG. 2 in that the CDFs 515 and CGFs 525 are implemented at separate, physical devices and are connected by Ga interfaces. However, it is understood that the CDFs 515 and CGFs 525 could alternatively be collapsed into a single integrated CDF/CGF. Thus, while the example embodiments of the present invention discussed below are described with respect to the offline charging system of FIG. 5, it is understood that the example embodiments could be modified for implementation in an example offline charging system configured with an integrated CDF/CGF.

The example CDR reporting processes described below may be adopted by any of the above-described billing systems, including but not limited to a conventional physically separate CDF and CGF system and/or a conventional integrated CDF/CGF system.

Further, each CDF 515 and/or CGF 525 may be further connected to a centralized database (not shown). The function of the centralized database will be discussed in greater detail later with respect to FIGS. 8 and 9.

CDF Based Correlation

Figure 6:
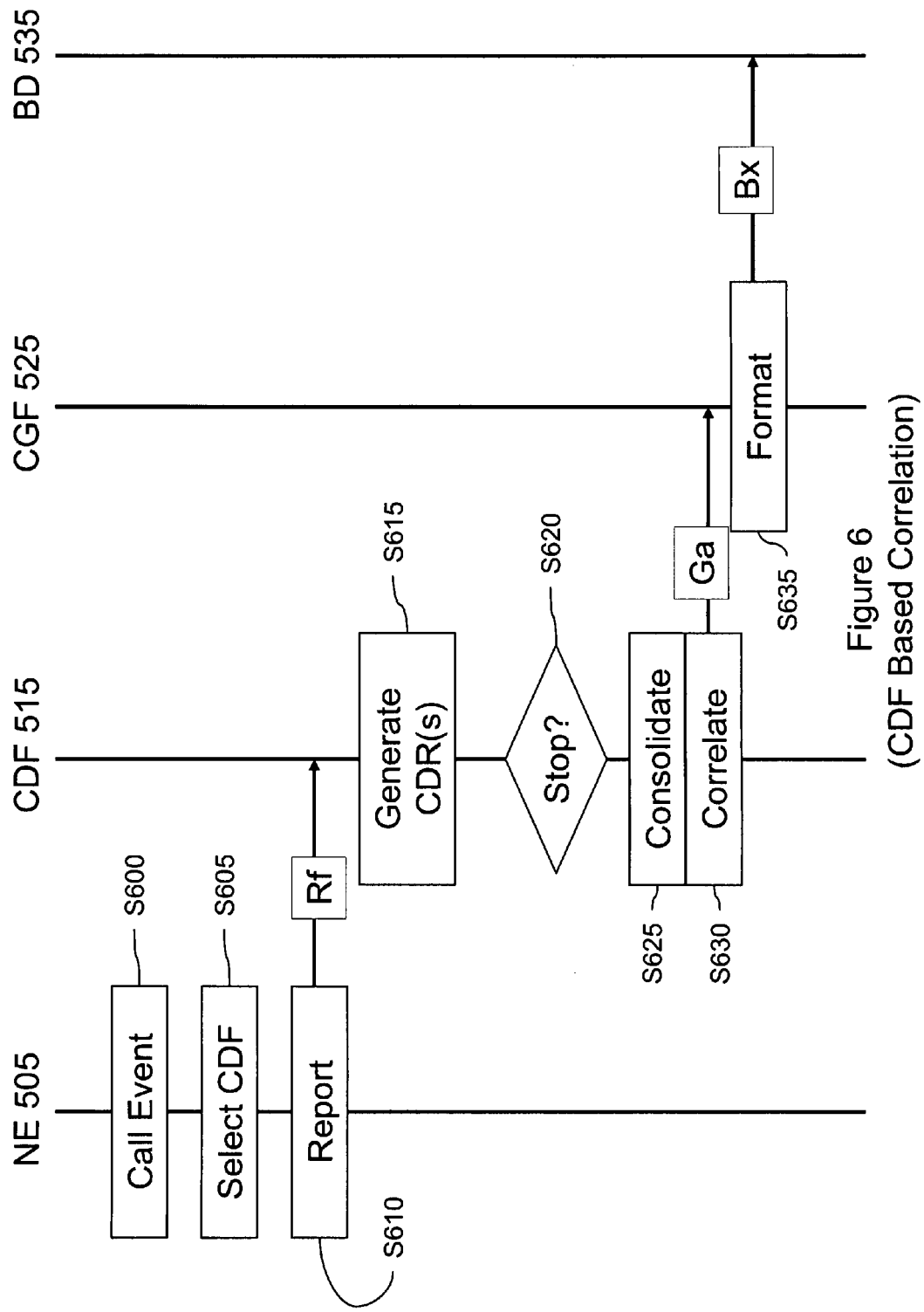
FIG. 6 illustrates a CDR reporting process employing charging data function (CDF) based correlation, and performed within the offline charging system of FIG. 5 according to an example embodiment of the present invention.

FIG. 6 illustrates a CDR reporting process employing CDF based correlation and performed within the offline charging system 500 of FIG. 5 according to an example embodiment of the present invention.

In the example embodiment of FIG. 6, in step S600, a call event or session (e.g., a call) occurs at one or more network elements 505. Each network element 505 participating in the call event/session selects one of the plurality of CDFs 515 in step S605.

In an example, if the offline charging system 500 is an Internet Protocol Multimedia Subsystem (IMS) network, the selecting step S605 may be based on an IMS Identification (ICID). The ICID is an identification of the call event or session from step S600, and is the same for each network element 505 participating in the call event or session from step S600. For example, in step S605, each network element 505 may select the same CDF 515. For example, in ICID based-routing performed at the network element(s), the network element sends charging information (e.g., ACRs) via the Rf interface to the CDF based on the ICID for the call event or session. The ICID is a unique ID generated a first participating network element for the call session/event, which is then shared with all other participating network elements. The network elements have a mechanism (e.g., a CDF routing table based on ICID) to send Rf ACR messages to particular CDFs based on the ICID, such that for a given call session/event with the same ICID, all ACR messages from different network elements are sent to the same CDF.

In another example, the selecting step S605 may be based on subscriber information for each respective network element 505 participating in the call event or session from step S600. For example, each network element 505 always selects the same CDF 515, such that different network elements 505 may report call events or sessions to same CDFs 515. In an example, to achieve a relatively balanced communication load between the network elements 505 and the CDFs 515, the subscriber-based CDF selection assignments may be evenly assigned among the CDFs 515. Subscriber information based CDR routing is an alternative routing mechanism as compared with ICID based routing. For subscriber information based routing, the network elements send Rf ACR messages to a given CDF for each call session/event. A mapping table is provided either in each network element or a Home Subscriber Server (HSS). If a network element is scheduled to send a Rf ACR message, the network element checks the table or queries HSS to determine to which CDF the subscriber is mapped. Thus, call charging information for call sessions/events for a given subscriber arrive at the same CDF. The ACRs for a single call will thereby arrive at the same CDF, and the CDF correlates all CDRs for the call session/event together based on the ICID. In a further example, load balance may be realized for ICID based ACR routing.

In the example embodiment of FIG. 6, in step S610, each network element 505 reports the call event or session from step S600 to the selected CDF 515 over the Rf interface. For example, the reporting step S610 may include sending an ACR to the selected CDF 515 with an AVP having information related to the call session or event.

In the example embodiment of FIG. 6, in step S615, each CDF 515 generates CDRs and/or partial CDRs based on the information sent from the network elements 505 in step S610. The CDR generating step S615 continues until a STOP triggering event occurs in step S620. For example, the STOP triggering event may be an ACR[stop] signal received from a serving call session control function (S-CSCF) of a "primary" or base network element 505. In other words, one of the network elements 505 participating in the call event or session is designated as a "primary" participant. The primary designation may, for example, be randomly selected, the called or calling party may be automatically selected as the NE, etc. Once the STOP triggering event occurs, the CDF 515 waits a given waiting time period.

Alternatively, while not illustrated in the example embodiment of FIG. 6, if the STOP triggering event does not occur within a given time threshold, CDR correlation is skipped for this particular call event/session, and any CDRs and/or partial CDRs generated at the CDF 515 are optionally forwarded to one of the CGFs 525.

After the given waiting time period, the CDF 515 consolidates all CDRs and partial CDRs for each network element 505 in step S625. Next, the CDF 515 correlates the CDRs for each of the network elements 505 participating in the billing session or event in step S630. "Correlating" means merging CDRs (e.g., consolidated CDRs or CDR files) of one session generated at a plurality of network elements. Accordingly, the "correlating" step S630 merges one or more consolidated CDRs for different network elements into a single, resultant correlated CDR. Here, to "merge" consolidated CDRs means analyzing collected CDRs (e.g., associated with a given call event or session for each network element), retrieving relevant CDR fields for the collected CDRs and then reorganizing/reformatting the collected CDRs into a new, merged CDR.

Then, the CDF 515 forwards the correlated CDRs to one of the CGFs 525 over the Ga interface.

In step S635, the CGF 525 receiving the forwarded CDRs from the CDF 515 formats the received CDRs for the billing domain 535 and then sends the formatted CDRs to the billing domain 535 over the Bx interface. Accordingly, the billing domain 535 need not support the particular multiple CDR handling protocols of the offline charging system 500 (e.g., IMS domain CDR, Service Domain CDR, bearer domain CDR, etc.) because the billing domain 535 assumes all charging data from different domains are sent to the CDF and the CDF correlates them into a consolidated CDR.

CGF Based Correlation

Figure 7:
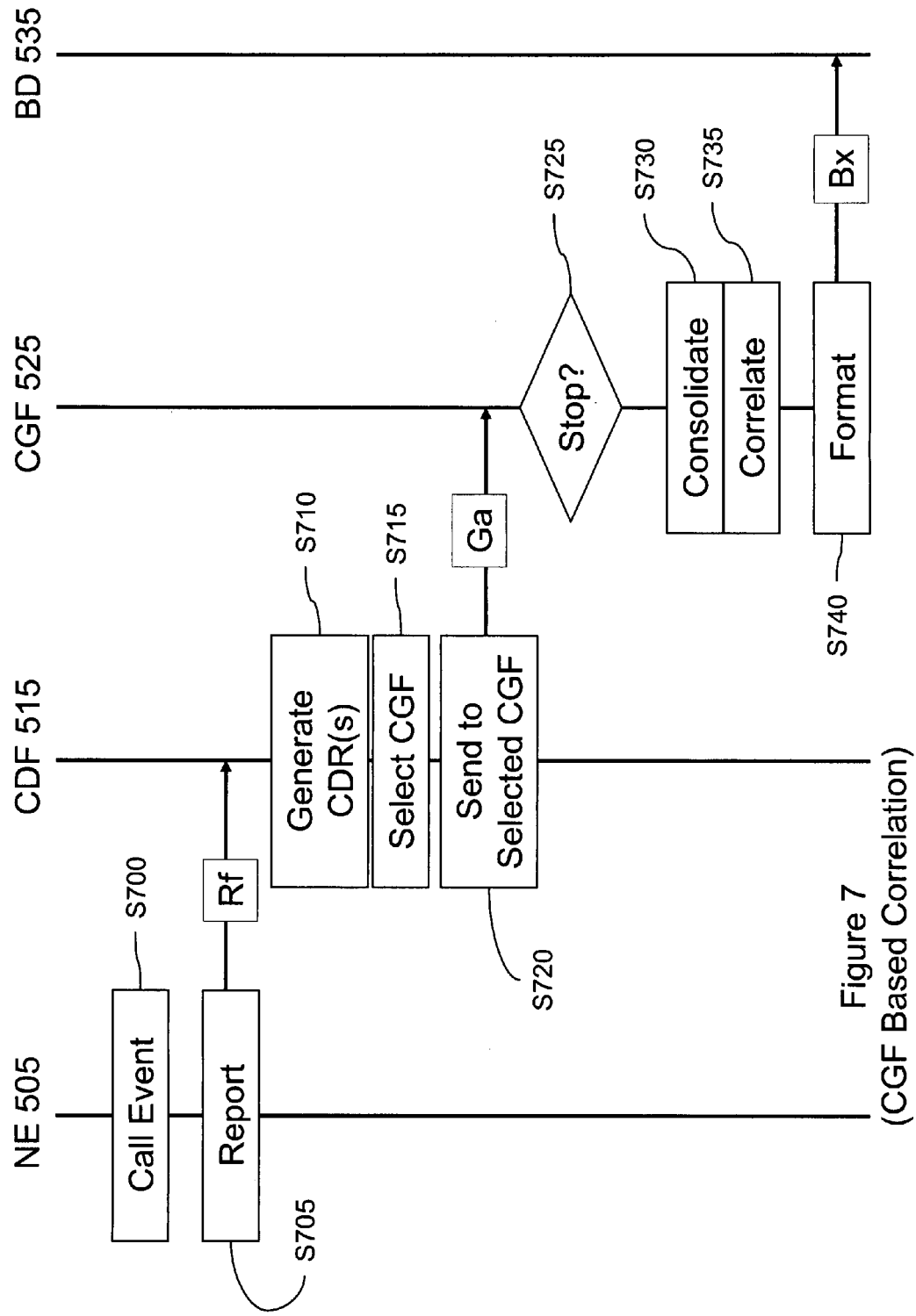
FIG. 7 illustrates a CDR reporting process employing charging gateway function (CGF) based correlation and performed within the offline charging system of FIG. 5 according to another example embodiment of the present invention.

FIG. 7 illustrates a CDR reporting process employing CGF based correlation within the offline charging system 500 of FIG. 5 according to another example embodiment of the present invention.

In the example embodiment of FIG. 7, in step S700, a call event or session (e.g., a call) occurs at one or more network elements 505. In step S705, each network element 505 reports the call event or session from step S700 to a given CDF 515 (e.g., which may be a selected CDF, a default CDF, etc.) over the Rf interface. For example, the reporting step S705 may include sending an ACR to the CDF 515 with an AVP having information related to the call session or event. The network elements 505 do not necessarily report to the same CDF 515 in step S705.

In the example embodiment of FIG. 7, in step S710, each CDF 515 generates CDRs and/or partial CDRs based on the information sent from the network elements 505. Next in step S715, each CDF 515 selects one of the plurality of CGFs 525. Generally, the selecting step S715 is similar to the selecting step S605 of FIG. 6 except the selecting step S715 is performed at one or more CDFs 515 instead of the network elements 505 and the selecting step S715 selects a CGF 525.

Thus, in an example, if the offline charging system 500 is an Internet Protocol Multimedia Subsystem (IMS) network, the selecting step S715 may be based on the ICID for the call event or session from step S700, and is the same for each network element 505 participating in the call event or session from step S700. For example, in step S715, each CDF 515 may select the same CGF 525. Here, for CGF based ICID correlation, the CDF, which generates CDRs, forwards the CDR(s) to the CGF based on the ICID. Thus, if multiple CDFs generate CDRs for a single call session/event, the multiple CDFs forward the CDRs to the same CGF based on ICID, so all CDRs for a single call session/event arrive at the same CGF, which can then correlate the CDRs, which will be described later In another example, the selecting step S715 may be based on subscriber information for each respective network element 505 participating in the call event or session from step S700. For CGF subscriber based correlation, the CDF maintains a subscriber-CGF mapping table. The CDF analyzes the table to determine which CGF the subscriber belongs to, and sends the CDRs to the mapped CGF. The CGF then correlates CDRs via ICID for a single session/call, as will be described later.

For example, each CDF 515 selects the same CGF 515 for CDRs based on charging information reported from a given network element 505. In an example, to achieve a relatively balanced communication load between the CDFs 515 and the CGFs 525, the subscriber-based CGF selection assignments may be evenly assigned among the CGFs 515.

In step S720, each CDF 515 sends the CDRs generated in step S710 to the selected CGF 525. The selected CGF 525 receives CDRs from one or more of the CDFs 515 until a STOP triggering event occurs in step S725. For example, the STOP triggering event may be an ACR[stop] signal (e.g., contained in a CDR received at the selected CGF 525) received from a serving call session control function (S-CSCF) of a "primary" or base network element 505. In other words, one of the network elements 505 participating in the call event or session is designated as a "primary" participant. Once the STOP triggering event occurs, the selected CGF 525 waits a given waiting time period in order to collect any delayed CDRs.

Alternatively, while not illustrated in the example embodiment of FIG. 7, if the STOP triggering event does not occur within a given time threshold, CDR correlation is skipped for this particular call event/session, and any CDRs and/or partial CDRs received at the CGF 525 may be formatted into CDR files and forwarded to the billing domain 535

After the given waiting time period, the selected CGF 525 consolidates the CDRs and partial CDRs for each network element 505 in step S730. Next, the selected CGF 525 correlates the CDRs for each of the network elements 505 participating in the call session or event in step S735 (e.g., see correlating step S635). In step S740, the selected CGF 525 formats the received CDR files for the billing domain 535 and then sends the formatted CDR files to the billing domain 535 over the Bx interface. Accordingly, the billing domain 535 need not support the particular multiple CDR handling protocols of the offline charging system 500 (e.g., IMS domain CDR, Service Domain CDR, bearer domain CDR, etc.) because the billing domain 535 assumes all charging data from different domains are already correlated and formatted.

CDF Based Correlation with Centralized Database

In the example embodiment of FIG. 6, it is possible that not all CDRs are sent to the same CDF 515. For example, not all network elements 505 may be configured for the selecting step S605. Also, if subscriber-based CDF selection is employed, it is possible that not all network elements 505 participating in a particular billing session or event are configured to report their charging information (e.g., ACRs over the Rf interface) to the same CDF 515. Accordingly, an example of dealing with such cases will now be described.

Figure 8:
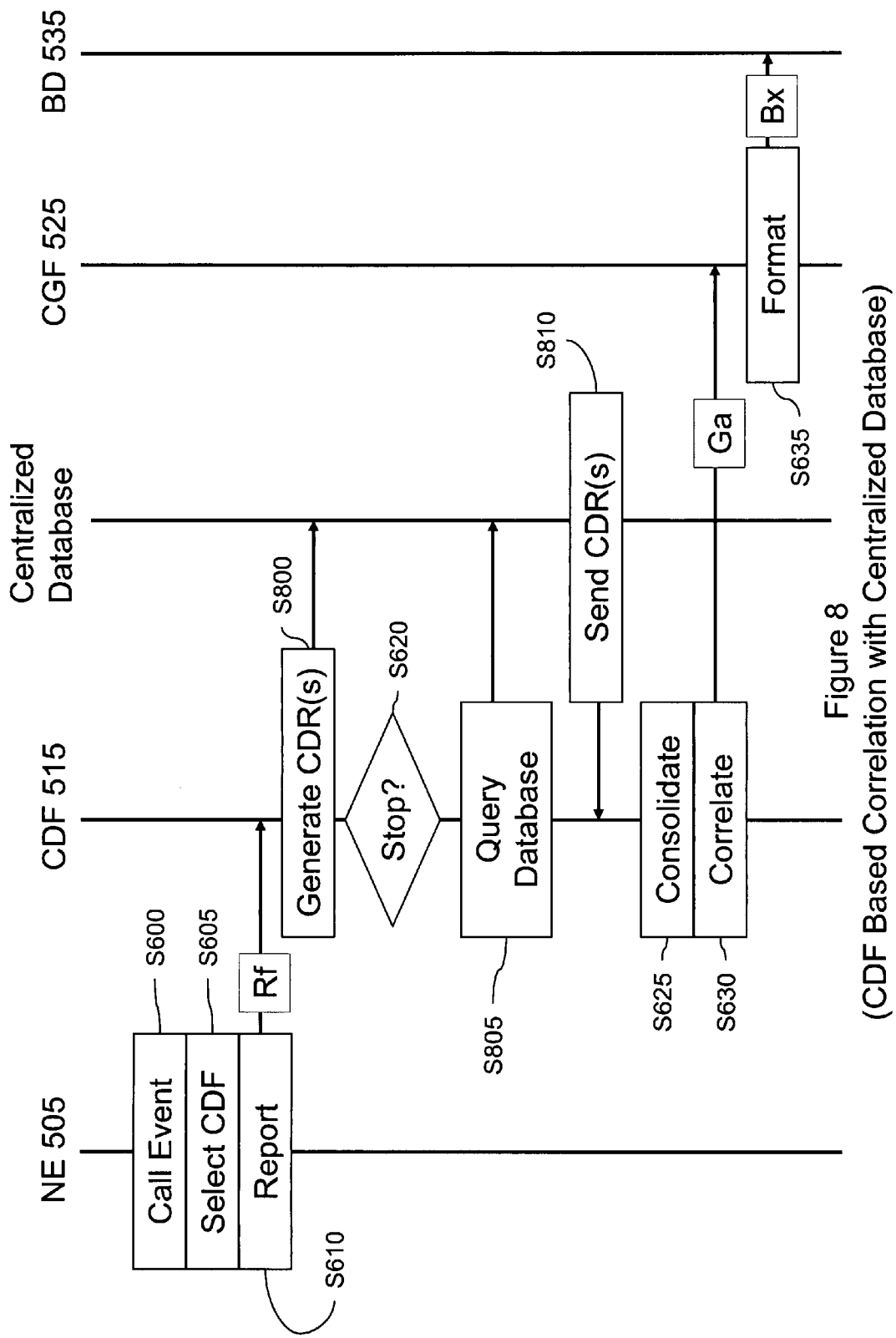
FIG. 8 illustrates a CDR reporting process employing CDF based correlation in conjunction with a centralized database within the offline charging system of FIG. 5 according to another example embodiment of the present invention.

FIG. 8 illustrates a CDR reporting process employing CDF based correlation in conjunction with a centralized database within the offline charging system 500 of FIG. 5 according to another example embodiment of the present invention.

In the example embodiment of FIG. 8, steps S600, S605, S610, S625, S630 and S635 are performed in the same manner as described above with respect to FIG. 6. Accordingly, a further description of the redundant steps will not be further described for the sake of brevity.

In the example embodiment of FIG. 8, in step S800, similar to step S615 of FIG. 6, each CDF 515 generates CDRs and/or partial CDRs based on the information sent from the network elements 505 in step S610. However, in FIG. 8, step S800 further includes forwarding all generated CDRs and partial CDRs to a centralized database, which maintains the CDRs sent by each CDF 515. In an example, the centralized database is a server connected to each CDF 515 (e.g., with an Internet connection). The CDR generating and forwarding step S800 continues until a STOP triggering event occurs in step S620. After the STOP triggering event step S620, the "primary" CDF 515 queries the centralized database in step S805 to request all CDRs relating to the billing session or event (e.g., all CDRs stored at the centralized database which share the ICID for the queried billing session/event) from step S600. For example, the primary CDF 515 may be the CDF 515 receiving ACR(s) from the "designated" network element 505, or S-CSCF. Accordingly, only one CDF 515 performs the querying step S805 (e.g., even if other CDFs 515 have been concurrently generating CDRs and forwarding the CDRs to the centralized database in step S800). In step S810, the centralized database sends the requested CDRs back to the requesting CDF 515. The process then advances to step S625 where the "full" set of CDRs is consolidated, and so on.

CGF Based Correlation with Centralized Database

In the example embodiment of FIG. 7, it is possible that not all CDRs are sent to the same CGF 525. For example, not all CDFs 515 may be configured for the selecting step S715. Also, if subscriber-based CGF selection is employed, it is possible that not all CDFs 515 are configured to select the same CGF 525 for all network elements 505 participating in a particular billing session or event. Accordingly, an example of dealing with such cases will now be described.

Figure 9:
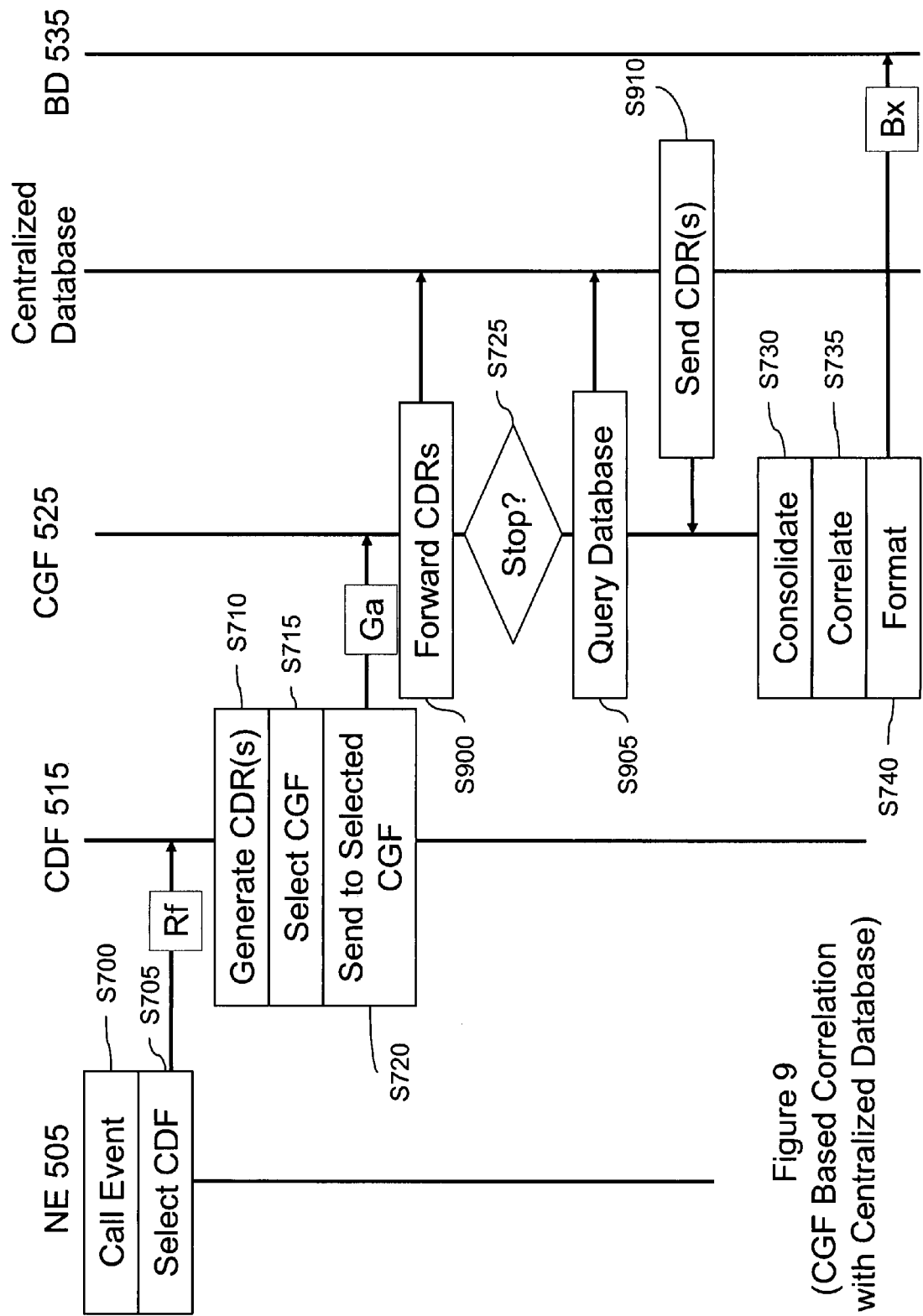
FIG. 9 illustrates a CDR reporting process employing CGF based correlation in conjunction with a centralized database within the offline charging system of FIG. 5 according to another example embodiment of the present invention.

FIG. 9 illustrates a CDR reporting process employing CGF based correlation in conjunction with a centralized database within the offline charging system 500 of FIG. 5 according to another example embodiment of the present invention.

In the example embodiment of FIG. 9, steps S700, S705, S710, S715, S720, S725, S730, S735 and S740 are performed in the same manner as described above with respect to FIG. 7. Accordingly, a further description of the redundant steps will not be further described for the sake of brevity.

In the example embodiment of FIG. 9, in step S900, after the CGF 525 receives the CDRs and/or partial CDRs from the CDFs 515, the CGF 525 forwards the received CDRs to a centralized database, which maintains CDRs sent by each CGF 525. In an example, the centralized database is a server connected to each CGF 525 (e.g., with an Internet connection). The CDR receiving and forwarding step S900 continues until a STOP triggering event occurs in step S725. After the STOP triggering event step S725, the "primary" CGF 525 queries the centralized database in step S905 to request all CDRs relating to the billing session or event from step S700. For example, the primary CGF 525 may be the CGF 525 receiving a CDR from the "designated" network element 505, or S-CSCF. Accordingly, only one CGF 525 performs the querying step S905 (e.g., even if other CGFs 525 have been concurrently receiving CDRs associated with the same call event/session and forwarding the CDRs to the centralized database in step S900). In step S910, the centralized database sends the requested CDRs back to the requesting CGF 525. The process then advances to step S730 where the "full" set of CDRs is consolidated, and so on.

Example embodiments of the present invention being thus described, it will be obvious that the same may be varied in many ways. For example, it is understood that the above-described offline charging networks and systems may be directed to any type of offline charging network, including but not limited to an offline bearer charging system, an offline Service charging network and/or an offline charging Internet Protocol Multimedia Subsystem (IMS) network.

Such variations are not to be regarded as a departure from the spirit and scope of the exemplary embodiments of the invention, and all such modifications as would be obvious to one skilled in the art are intended to be included within the scope of the invention.

What is claimed:

1. A method of correlating charging data records within an offline charging system, comprising:
    selecting, at each of a plurality of sources, a same one of a plurality of charging functions in which to route charging information associated with a given call session or event, the plurality of charging functions corresponding to at least one of a plurality of charging data functions (CDFs) and a plurality of charging gateway functions (CGFs); and
    correlating, at the selected charging function, the routed charging information from each of the plurality of sources.

2. The method of claim 1, wherein the plurality of sources correspond to a plurality of network elements and the plurality of charging functions correspond to the plurality of charging data functions (CDFs).

3. The method of claim 2, further comprising:
    receiving accounting information associated with the given call session or event from at least one of the plurality of network elements at the selected CDF;
    generating, at the selected CDF, one or more charging data records (CDRs) or partial CDRs based on the sent accounting information;
    determining whether to stop generating CDRs or partial CDRs based on a stop triggering event;
    consolidating the CDRs and partial CDRs generated by each network element into a consolidated CDR associated with that network element based on the determining step; and
    wherein the correlating step correlates the consolidated CDRs by merging the consolidated CDRs.

4. The method of claim 3, further comprising: forwarding the CDRs and partial CDRs generated during the generating step to a centralized database, the centralized database receiving CDRs and partial CDRs from at least one CDF other than the plurality of CDFs;
    querying the centralized database for the CDRs and partial CDRs associated with the given call session or event after the stop triggering event occurs;
    receiving the queried CDRs and partial CDRs from the centralized database; and
    wherein the consolidating step consolidates at least based on the received, queried CDRs and partial CDRs.

5. The method of claim 3, wherein the stop triggering event is the received accounting information including a stop indication.

6. The method of claim 5, wherein the stop indication only triggers the stop triggering event if received from a designated one of the plurality of network elements.

7. The method of claim 3, further comprising:
    formatting the correlated charging information for a billing domain; and
    sending the correlated charging information to the billing domain.

8. The method of claim 1, wherein the plurality of sources correspond to a plurality of charging data functions (CDFs) and the plurality of charging functions correspond to the plurality of charging gateway functions (CGFs).

9. The method of claim 8, further comprising: receiving at least one CDR or partial CDR associated with the given call session or event from at least one of the plurality of CDFs at the selected CGF;
    determining whether to stop generating CDRs or partial CDRs based on a stop triggering event;
    consolidating the received CDRs and partial CDRs generated by each CDF for the given call session or event into a consolidated CDR associated with that CDF; and
    wherein the correlating step correlates the consolidated CDRs by merging the consolidated CDRs.

10. The method of claim 9, further comprising: forwarding the CDRs and partial CDRs received during the receiving step to a centralized database, the centralized database receiving CDRs and partial CDRs from CGFs other than the plurality of CGFs;
    querying the centralized database for the CDRs and partial CDRs associated with the given call session or event after the stop triggering event occurs;
    receiving the queried CDRs and partial CDRs from the centralized database; and
    wherein the consolidating step consolidates at least based on the received, queried CDRs and partial CDRs.

11. The method of claim 9, wherein the stop triggering event is one of the received CDRs or partial CDRs being based on accounting information, sent from a network element to one of the plurality of CDFs, including a stop indication.

12. The method of claim 11, wherein the stop indication only triggers the stop triggering event if received from a designated one of the plurality of network elements.

13. The method of claim 9, further comprising:
formatting the correlated charging information for a billing domain; and sending
the correlated charging information to the billing domain.

14. The method of claim 1, further comprising:
formatting the correlated charging information for a billing domain; and
sending the correlated charging information to the billing domain.

15. The method of claim 14, wherein the formatting step is performed at a charging gateway function (CGF).

16. The method of claim 14, wherein the sending step sends the correlated charging information as a charging data record (CDR) Mfie, the CDR file including at least one CDR or partial CDR.

17. The method of claim 1, wherein the selecting step selects, at each of the plurality of sources, the same one of a plurality of charging functions based on one of a (i) call session or event identifier and (ii) a subscriber identifier.

18. The method of claim 17, wherein the call session or event identifier is an Internet Protocol Multimedia Subsystem (IMS) Identification (ICID) which identifies the given call session or event.

19. The method of claim 17, wherein the subscriber identifier identifies a subscriber associated with the given call session or event.

20. The method of claim 1, further comprising:
routing, from at least one source other than the plurality of sources, charging information to one of the plurality of charging functions other than the selected charging function; and
querying a centralized database, from the selected charging function, for the charging information routed from the at least one other source; and
receiving, from the centralized database, the queried charging information,
wherein the correlating step performs correlation based at least in part on the queried charging information.

21. The method of claim 1, wherein the offline charging system includes one of an offline bearer charging network, an offline service charging network and/or an offline charging Internet Protocol Multimedia Subsystem (IMS) network.

22. The method of claim 1, wherein the correlating step includes merging the routed charging information for each of the plurality of sources into a single file.

23. The method of claim 1, wherein the selecting step selects, at each of the plurality of sources, the same one of the plurality of charging functions by cross-referencing mapping table with a subscriber identifier.

24. The method of claim 23, wherein the mapping table lists a particular charging function associated with an assigned subscriber identifier for each subscriber.

* * * * *